United States Patent [19]

Bien

[11] Patent Number: 4,603,865

[45] Date of Patent: Aug. 5, 1986

[54] DRIVE MOTOR GEAR LUBRICANT SEAL FOR LOCOMOTIVES AND THE LIKE

[75] Inventor: Paul R. Bien, Downers Grove, Ill.

[73] Assignee: General Motors Corporation, Detroit, Mich.

[21] Appl. No.: 704,758

[22] Filed: Feb. 25, 1985

[51] Int. Cl.[4] ............... F16J 15/34; F16J 15/447; F16H 57/02

[52] U.S. Cl. .................... 277/12; 277/56; 277/68; 277/84; 74/606 R

[58] Field of Search .............. 277/12, 32, 82, 84, 277/53, 55, 56, 67–69; 74/606 R, 606 A

[56] References Cited

U.S. PATENT DOCUMENTS

| | | | |
|---|---|---|---|
| 1,400,119 | 12/1921 | Whittingham | 74/606 X |
| 1,914,891 | 6/1933 | McAllister | 277/67 |
| 4,363,490 | 12/1982 | Kuehn | 277/56 X |
| 4,464,593 | 8/1984 | Kofink | 277/56 X |
| 4,470,324 | 9/1984 | Renk et al. | 74/606 R |
| 4,565,378 | 1/1986 | Wehrfritz et al. | 277/53 X |

FOREIGN PATENT DOCUMENTS

| | | | |
|---|---|---|---|
| 2530525 | 1/1977 | Fed. Rep. of Germany | 74/606 R |
| 1082076 | 6/1954 | France | 74/606 R |

Primary Examiner—Robert S. Ward
Attorney, Agent, or Firm—Robert J. Outland

[57] ABSTRACT

A novel seal member for a known drive system of the type used in General Motors diesel locomotives and the like which is applicable between the outer seal member of the traction motor and an associated pinion and provides a lip seal to reduce escape of lubricant through migration up the armature shaft and a return duct for conducting lubricant from drain openings of an internal labyrinth seal back into the gear case while blocking any interfering lubricant flow generated by gear action from impinging upon the drain openings and being forced out of the gear case.

6 Claims, 8 Drawing Figures

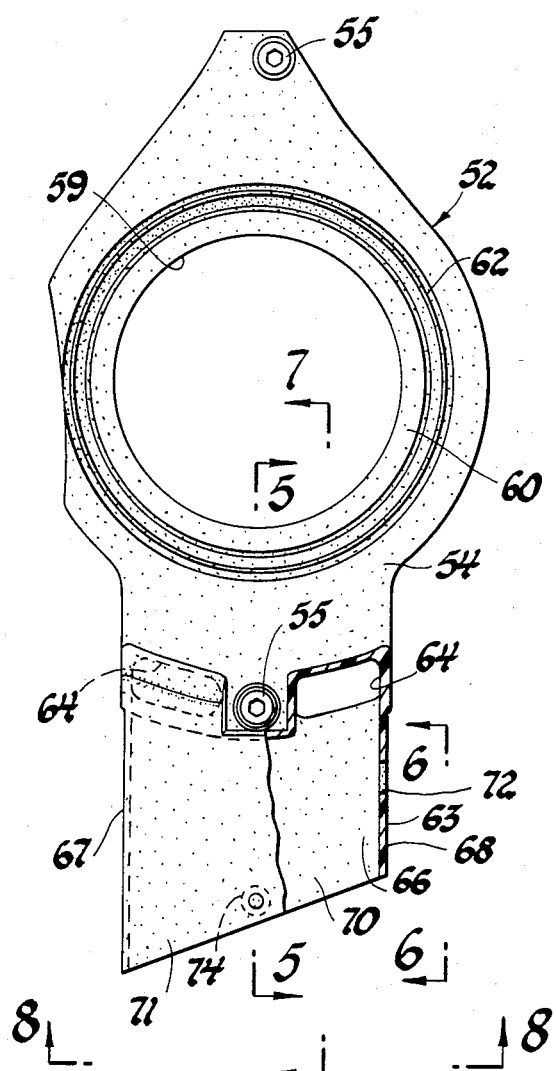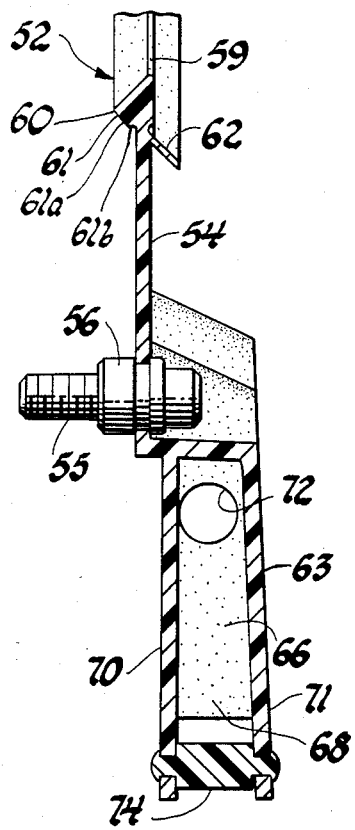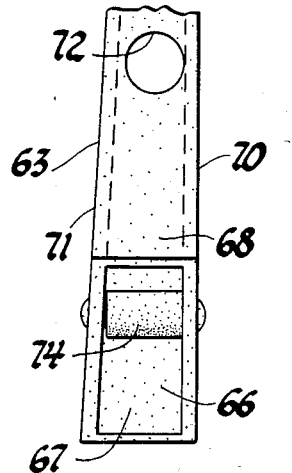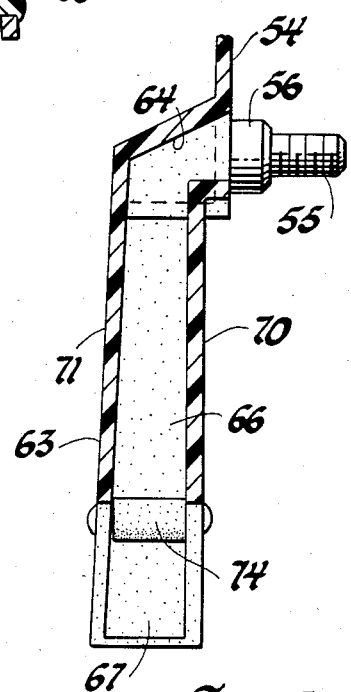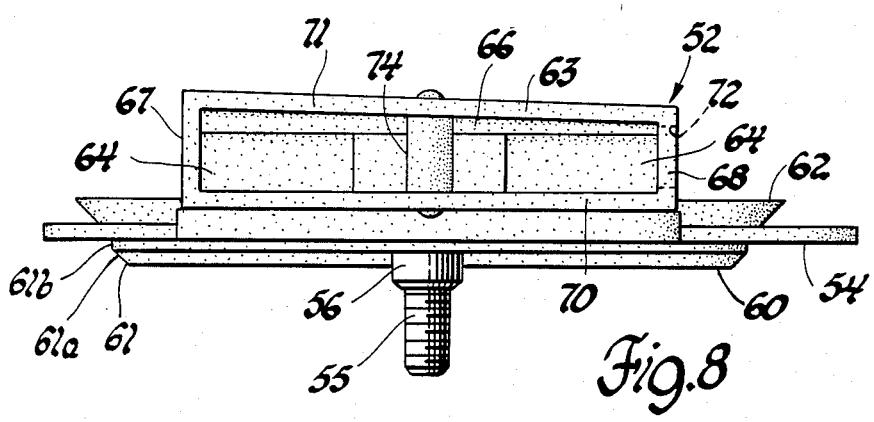

DRIVE MOTOR GEAR LUBRICANT SEAL FOR LOCOMOTIVES AND THE LIKE

TECHNICAL FIELD

This invention relates to electric motor gear drive systems for railway locomotives and the like and to gear lubricant seals for such systems. More particularly, the invention relates to a gear lubricant seal in combination with a drive motor and lubricated gear system to assist in limiting lubricant loss from an associated gear case.

BACKGROUND

It is known in the art relating to drive systems for diesel electric locomotives and the like to provide a railway truck mounted axle hung electric traction motor partially supported upon and geared to a drive axle by engaged pinion and drive gears. The gears are lubricated by heavy fluid lubricant contained in a gear case surrounding the gears on the pinion end of the traction motor and on the axle.

To restrict the escape of lubricant from the gear case along the traction motor shaft, the motor is provided with an outer seal. This combines with a shaft mounted oil slinger to direct lubricant escaping past a labyrinth toward internal drain openings in the outer seal through which the lubricant is returned to the gear case. Excess lubricant escapes past a partition plate to an external drain in the pinion end bearing cover and is lost from the gear case.

Under certain operating conditions when the lower part of the drive gear is turning in a direction toward the pinion and the lubricant level in the gear case is relatively high, sufficient lubricant may be pushed or thrown toward the pinion to cause a build-up of lubricant in the vicinity of the internal drain openings. This can force lubricant through the openings into the slinger area and result in a loss of lubricant in the gear case. The effect of this condition, as well as the possibility of excess lubricant flow from the pinion along the traction motor armature shaft and into the slinger area, combine to result in the possibility of excess lubricant loss, requiring inspection and replacement of lubricant at shorter than desired time intervals.

SUMMARY OF THE INVENTION

The present invention provides a supplemental unitary seal and return duct member, preferably molded of an elastomeric polymer, which is mountable on the gear case exposed face of the outer seal member. The supplemental seal provides, in combination, a face-type pinion engaging lip seal that restricts lubricant flow from around the pinion to the armature shaft and an enclosed drain duct extending downwardly from the inner drain openings into the gear case to restrict the flow and impingement of lubricant against the internal drain openings. These features combine to restrict undesired lubricant passage into the labyrinth seal and slinger area and substantially reduce the possibility of undesired lubricant loss from the gear case.

A feature of the invention is that it provides a relatively thin body mountable against the outer seal plate near the inner end of the pinion and attached by fasteners replacing two of the normal outer seal attaching fasteners. Another feature of the invention is that it includes an annular pilot for locating the seal on the seal plate with a central opening centered on the axis of the armature shaft. Another feature is that it provides a flexible sealing lip extending outwardly into engagement with the associated pinion to restrict lubricant flow from the gear case against the armature shaft. Still another feature is that the supporting body is integrated with an enclosed duct extending downwardly from the inner edge of the internal drain openings in the outer seal to conduct lubricant downward and protect against impingement of lubricant in the gear case against the internal drain openings.

These and other features and advantages of the invention will be more fully understood from the following description of a preferred embodiment taken together with the accompanying drawings.

BRIEF DRAWING DESCRIPTION

In the drawings:

FIG. 4 is an outer plan view of a seal in accordance with the invention having a portion broken away to show the interior of the duct;

FIG. 5 is a transverse cross-sectional view of the seal from the plane indicated by the line 5—5 of FIG. 4;

FIG. 6 is a side view of a portion of the seal from the plane indicated by the line 6—6 of FIG. 4;

FIG. 7 is a transverse cross-sectional view from the plane indicated by the line 7—7 of FIG. 4; and FIG. 8 is a bottom view of the seal from the plane indicated by the line 8—8 of FIG. 4.

DETAILED DESCRIPTION

Figure 1:
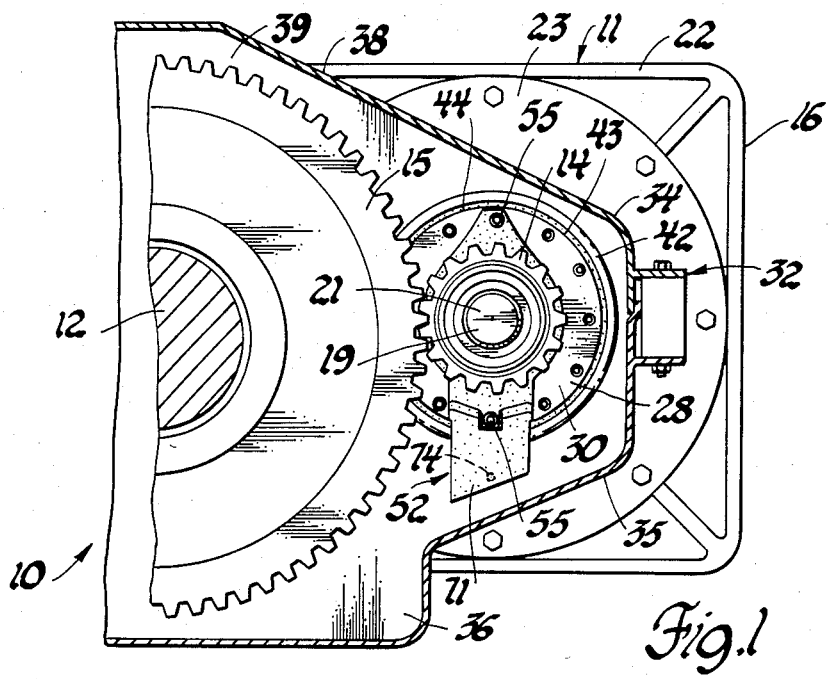
FIG. 1 is a fragmentary longitudinal cross-sectional view through the gear case of a locomotive electric traction motor drive system having seal means in accordance with the invention.
Figure 2:
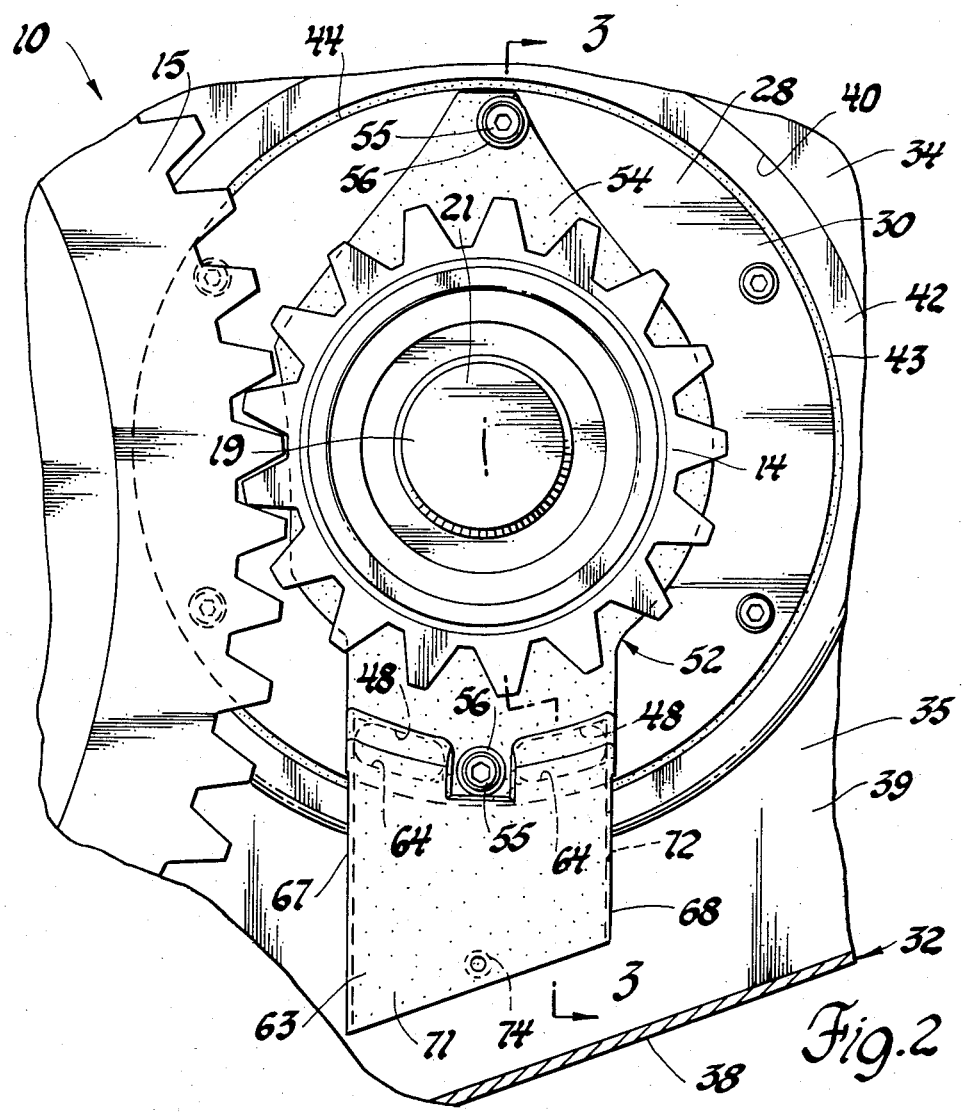
FIG. 2 is an enlarged view of a portion of FIG. 1 showing application of a seal in accordance with the invention.
Figure 3:
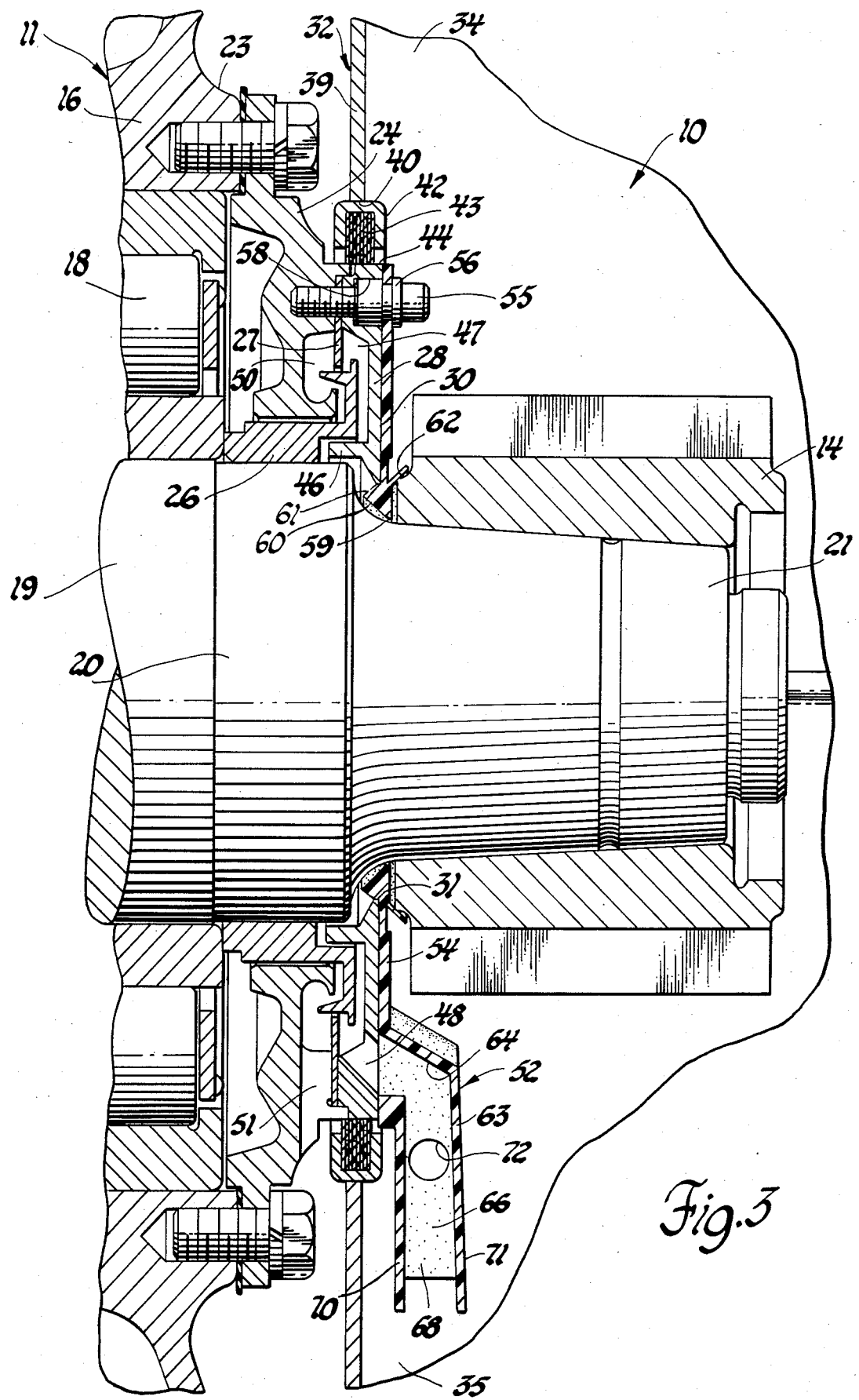
FIG. 3 is a transverse cross-sectional view from the plane indicated by the line 3—3 of FIG. 2 showing portions of the traction motor, pinion and seal construction.

Referring now to the drawings in detail, numeral 10 generally indicates the traction motor and axle drive system of a diesel-electric locomotive, particularly of a type manufactured by General Motors' Electro-Motive Division. System 10 includes an electric traction motor 11 and a wheeled drive axle 12 permanently coupled together by a pair of engaged gears, including a pinion 14 and a drive gear 15.

The traction motor 11 includes a frame 16 which carries a pair of axially spaced bearings 18, only one of which—the pinion end bearing, is shown. Bearings 18 support a rotatable armature shaft 19 which carries and is rotatable with the traction motor armature, not shown. Near the end of the shaft beyond the pinion end bearing 18, there is provided a generally cylindrical slinger mounting portion 20 and, outwardly thereof, a reduced diameter, tapered pinion mounting stub 21 on which the pinion 14 is mounted, such as by shrink fitting in a fixed position.

The traction motor frame 16 includes two major components: the main frame portion 22 which encloses the traction motor field poles and armature and is open at one end to permit removal of the armature; and the pinion end housing 23 which mounts on the open end of the main frame and carries the pinion end bearing 18. A bearing cover 24, centrally mounted on the end of the pinion end housing, covers the side of the bearing 18, which is preferably permanently grease lubricated, and extends around an oil slinger 26 carried on the mounting portion 20 of the armature shaft and rotatable therewith. A partition plate 27 and an outer seal 28 having a generally flat outer surface 30 are fixedly mounted to the exterior of the bearing cover 24. The outer seal includes a central opening 31 through which the pinion mounting stub 21 of the armature shaft extends to mount the pinion near the outer surface 30.

The drive axle 12 is carried in axle bearings, not shown, mounted in the traction motor frame at a fixed center distance from the axis of the armature shaft 19 so that the center distance of the gears 14, 15 is fixed and the gears remain in constant engagement. Lubrication is provided by a heavy special purpose fluid lubricant which for convenience, may be referred to as oil. The lubricant is contained within a gear case 32, conventionally formed in separable upper and lower portions 34, 35 respectively, and assembled together to be supported by extensions of the traction motor frame in conventional manner.

The gear case encloses the gears 14, 15 and provides a sump 36 for retention of an adequate volume of lubricant. The gear case includes peripheral walls 38 and side walls, only the inner side wall 39 of which is shown. An opening 40 in the inner side wall is provided with a U-shaped peripheral seal retainer 42 carrying a felt seal 43 split between the upper and lower gear case halves. The seal 43 engages the outer periphery 44 of the traction motor seal 28 to prevent loss of lubricant from the gear case. Other seals, not shown, are provided at openings in the side walls around the drive axle 12.

To further control the escape of lubricant from the gear case along the armature shaft through the opening 31, the outer seal is provided with an annular lip 46 that coacts with a recess in the oil slinger 26 to provide a labyrinth passage into an internal labyrinth annular cavity 47 defined by the outer seal 28, the partition plate 27 and the oil slinger 26. Lubricant which passes up the armature shaft through the opening 31 is thrown into this cavity 47 by the oil slinger and runs downwardly to drain openings 48 of an internal labyrinth drain that directs the fluid back to the inside of the gear case. If excess lubricant collects in the internal labyrinth cavity 47, it can escape through an opening between the partition plate 27 and oil slinger 26 into an external labyrinth annular cavity 50. There it drains down into external drain openings 51 which open outside the traction motor and gear case and allow the excess lubricant to escape.

The portions of the drive system so far described represent a known arrangement of the prior art currently in widespread use. While operation of the described mechanism is fully acceptable in most instances, there are possible conditions of service and operation wherein excessive loss of lubricant may occur from the gear case. If, for example, the lubricant level in the gear case is maintained higher than intended, an excess amount of lubricant may migrate up the shaft and into the labyrinth. Some of this lubricant may escape into the external labyrinth and be lost through the drain openings 51. Likewise, lubricant may be thrown by the gear 15 against the drain openings 48, causing a backing up of lubricant into the internal labyrinth cavity 47 which can force some of the lubricant past the partition plate into the external cavity 50 and out the drain openings 51.

To limit the loss of lubricant under these conditions, the present invention provides an added integral gear lube seal and return duct member 52. The seal member 52 is preferably molded of an elastomeric polymer material, such as an imide modified ester of limited resilience capable of maintaining its integrity in the range of moderately high to very low temperature operating conditions that may exist within the gear case. The seal 52 includes a flat relatively thin body 54 which mounts against the outer surface 30 of the outer seal member 28, extending between it and the inner end of the pinion 14. The body 54 is retained in place on the outer seal by a pair of socket head screws 55 carrying grooved spacers 56 which snap into openings provided in the body 54. The spacers are received in recesses 58 of the outer seal provided for the heads of two of the original socket head screws used to secure the outer seal and which are replaced by the screw and spacer assemblies 55, 56.

Centrally disposed between the socket head screws 55, the body is provided with a central opening 59 having an inwardly extending raised annular pilot 60 with an outer surface 61 combining generally triangular conical and cylindrical portions 61a, 61b respectively, which are adapted to mate with the outer seal openings 31 of various models of traction motors. The pilot 60 extends through the opening 31 of the outer seal to locate the seal member 52 in its proper position. Opposite the pilot 60, the seal 52 is provided with a flexible face lip seal 62 which extends outwardly from the body 54 into engagement with the inner end of the pinion 14.

Since the traction drive system 10 is capable of being used with pinions and gears of several sizes and the spacing between the inner end of the pinion and the outer face 30 of the outer seal 28 can vary considerably upon installation, the lip seal 62 is intentionally made longer than necessary for most applications so that it will contact the inner face of the pinion whichever size pinion is used and whatever the spacing resulting from the assembly process. Thereafter the rubbing contact of the resilient material of the lip seal on the pinion will allow any excess material of the lip to wear away leaving, after a period of service, only enough of the lip to provide a light contact with the end of the pinion. The lip seal thus initially and ultimately provides a barrier which substantially reduces the amount of lubricant allowed to reach the portion of the armature shaft between the pinion and the outer seal 28, thus substantially reducing the migration of gear lubricant through the opening 31 and into the labyrinth cavities.

In addition to the foregoing, the seal member 52 contains on its lower edge an inner labyrinth drain return duct 63. This duct includes a pair of outwardly extending passages 64 which open through the body 54 to connect with the inner drain openings 48. The passages 64 extend on opposite sides of the location of the lower socket head screw 55 and connect with the top of a downwardly extending passage 66 formed by parallel side walls 67, 68 and connecting inner and outer walls 70, 71. The passage walls are cut off at an angle at the bottom to provide clearance from the peripheral wall 35 of the gear case and to provide a preferential barrier of the longer side wall 67 against the entry into the passage 66 of lubricant flowing from the gear 15. A side drain opening 72 may be provided in the shorter side wall 68 to further encourage the escape of fluid from the duct on the side away from the gear 15. A spacer element 74 is preferably provided between the walls 70, 71 to provide stiffness and prevent the resilient walls from collapsing.

Preferably, at the time of assembly of the seal member 52 to the outer seal 28, beads of room temperature vulcanizing (RTV) material are applied around the passages 64 of the body 54 to engage the outer surface 30 of the outer seal. The RTV material helps stabilize the mounting and also acts as a gasket to resist leakage of lubricant between the opposed surfaces of the seal member 52 and outer seal 28.

In operation in either direction of gear rotation, lubricant picked up by the gear 15 and in part transferred to pinion 14 is thrown off around the walls of the gear case and runs down the sides to return to the sump. Migration of the lubricant onto the armature shaft between the pinion and traction motor outer seal is substantially reduced or prevented by the presence of the face lip seal 62 engaging the inner end of the pinion 14. In addition, when the rotation of the gears is such that the lower portion of gear 15 forces fluid in the direction of the pinion, the duct 63, extending downwardly and covering the internal drain openings 48, provides a barrier to reduce or prevent the forcing of lubricant into the drain openings 48. Thus, the duct 63 provides a protected passage through which any lubricant reaching the internal labyrinth cavity can return to the gear case through the internal drain openings 48 without being restricted from its return by the pressure of lubricant within the gear case against the face of the drain openings.

The combined features of the novel seal and return duct member 52, as applied to the known drive system for railway electric traction drives of the type used on General Motors' diesel-electric locomotives and other similar products, provide an improved arrangement capable of being applied not only in new assemblies, but also to existing units in the field for substantially reducing the amount of lubricant lost from the gear cases under certain operating conditions.

While the invention has been described by reference to one specific embodiment, it should be understood that numerous changes could be made without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows:

1. A unitary seal in combination with a motor and drive gear system having a motor frame with attached gear case enclosing a pair of engaged drive gears and containing lubricant for lubrication of the gears, the motor having a shaft opening and a surrounding seal plate open to the gear case interior and through which extends a motor shaft carrying one of said gears spaced adjacent said seal plate, said seal plate including at least one inner drain opening below the shaft opening and communicating directly with the gear case interior to return lubricant passing through the shaft opening to the gear case, said inner drain opening being connected internally through a labyrinth seal with external drain openings outside the gear case to exhaust lubricant passing the labyrinth seal, said unitary seal comprising
a flat body mountable on the seal plate within the gear case and having an opening for the motor shaft, said body extending into close radial spacing with said shaft,
locating means in said body for locating said body on said seal plate, around said motor shaft opening,
a flexible annular sealing lip around said seal opening on a front side of said body and extending outward into close relation with the adjacent end of the shaft-carried gear to limit the flow of lubricant from the gear case into the motor opening, and
means defining an enclosed duct depending from the bottom and front side of said body within the gear case, said duct including a drain opening through the back of said body and aligned with said seal plate inner drain opening and an opening at the bottom of said duct communicating with said gear case interior, said duct permitting the discharge of lubricant from the seal plate drain opening to the gear case interior while tending to block the flow of lubricant thrown or forced up by rotation of the gears from entering the seal plate drain opening and being forced through the labyrinth seal to the external drain, thereby reducing the loss of lubricant from the gear case during operation.

2. A unitary seal in combination with a motor and drive gear system having a motor frame with attached gear case enclosing a pair of engaged drive gears and containing lubricant for lubrication of the gears, the motor having a shaft opening and a surrounding seal plate open to the gear case interior and through which extends a motor shaft carrying one of said gears spaced adjacent said seal plate, said seal plate including at least one inner drain opening below the shaft opening and communicating directly with the gear case interior to return lubricant passing through the shaft opening to the gear case, said inner drain opening being connected internally through a labyrinth seal with external drain openings outside the gear case to exhaust lubricant passing the labyrinth seal, said unitary seal comprising
a flat body mountable on the seal plate within the gear case and having an opening for the motor shaft, said body extending into close radial spacing with said shaft,
a raised annular pilot around said seal shaft opening on a back side of said body and having a piloting outer surface engaging an edge of said motor shaft opening to pilot said unitary seal,
a flexible annular sealing lip around said seal opening on a front side of said body and extending conically outward into engagement with the adjacent end of the shaft-carried gear to limit the flow of lubricant from the gear case into the motor opening, and
means defining an enclosed duct depending from the bottom and front side of said body within the gear case, said duct including a drain opening through the back of said body and aligned with said seal plate inner drain opening and an opening at the bottom of said duct communicating with said gear case interior, said duct permitting the discharge of lubricant from the seal plate drain opening to the gear case interior while tending to block the flow of lubricant thrown or forced up by rotation of the gears from entering the seal plate drain opening and being forced through the labyrinth seal to the external drain, thereby reducing the loss of lubricant from the gear case during operation.

3. A combination as in claim 2 wherein said seal plate is secured to said motor frame by a plurality of fasteners, said seal further including a pair of fastener receiving openings in said flat body and spaced from said seal opening in alignment with two of said fasteners, said two fasteners securing both said seal and said seal plate to said motor frame.

4. A unitary motor gear lubricant seal formed of resilient material and comprising a flat body having a shaft opening therethrough, locating means on the body for locating the body on an associated motor, a raised annular flexible sealing lip around said opening on a front side of said body and extending outward for close relation with an associated gear end surface, and depending duct means on a lower portion of said body below said opening, said duct means including a drain opening through the back of said body and an open bottom for the discharge of drained lubricant therethrough.

5. A unitary motor gear lubricant seal formed of resilient plastic material and comprising a flat body having a shaft opening therethrough, a raised annular pilot around said opening on a back side of said body, said pilot having an outer piloting surface, a raised annular flexible sealing lip around said opening on a front side of said body and extending conically outward for engagement with an associated gear end surface, and depending duct means on a lower portion of said body below said opening, said duct means including a drain opening through the back of said body and an open bottom for the discharge of drained lubricant therethrough.

6. A seal as in claim 5 and further comprising fastener openings in said body above and below said shaft opening for securing said seal to a supporting member surrounding a shaft.

* * * * *